United States Patent
Suzuki et al.

(10) Patent No.: US 7,011,542 B2
(45) Date of Patent: Mar. 14, 2006

(54) PHOTOCOUPLER

(75) Inventors: Shigeo Suzuki, Tokyo (JP); Mineo Mizukami, Tokyo (JP)

(73) Assignee: Jamco Corporation, Tokyo (JP)

( * ) Notice: Subject to any disclaimer, the term of this patent is extended or adjusted under 35 U.S.C. 154(b) by 1 day.

(21) Appl. No.: 10/813,121

(22) Filed: Mar. 31, 2004

(65) Prior Publication Data

US 2005/0070152 A1    Mar. 31, 2005

(30) Foreign Application Priority Data

Sep. 29, 2003    (JP) ............................. 2003-336705

(51) Int. Cl.
*H01R 13/64* (2006.01)
(52) U.S. Cl. ..................... 439/374; 439/378
(58) Field of Classification Search ............ 439/374 I, 439/378 X, 928.1
See application file for complete search history.

(56) References Cited

U.S. PATENT DOCUMENTS

| | | | | |
|---|---|---|---|---|
| 4,895,425 A | * | 1/1990 | Iwano et al. .................. 385/60 |
| 5,269,698 A | * | 12/1993 | Singer .......................... 439/157 |
| 5,808,867 A | * | 9/1998 | Wang .......................... 361/695 |
| 5,882,220 A | * | 3/1999 | Horii et al. .................. 439/297 |
| 5,993,241 A | * | 11/1999 | Olson et al. ................. 439/378 |
| 6,764,222 B1 | * | 7/2004 | Szilagyi et al. ............... 385/55 |

FOREIGN PATENT DOCUMENTS

| JP | 7-135338 | 5/1995 |
|---|---|---|
| JP | 10-155562 | 6/1998 |

* cited by examiner

Primary Examiner—Thanh-Tam Le
(74) Attorney, Agent, or Firm—Westerman, Hattori, Daniels & Adrian, LLP

(57) ABSTRACT

A galley body includes a storage unit 100 having a pair of guide rails 110 disposed on the bottom thereof for guiding a device to be mounted detachably to the galley. A connect panel 200 formed integrally to the galley body for connecting the device is disposed at the back of the storage unit 100. A connector 210 is disposed on the connect panel 200. A pair of guide holders 230, 240 is implanted in the connect panel 200 on both sides of the connector 210. The guide holders 230, 240 are formed for example of metal pipes having a light receiving member 232 or a light emitting member 242 composing the photocoupler disposed in the inside thereof, respectively. On the other hand, guide pins mounted on the device to be connected and corresponding to the guide holders 230, 240 have a light emitting member or a light receiving member composing the photocoupler disposed in the inside thereof, respectively. A two-way communication circuit is established between the device and galley body via the photocouplers composed of these members.

3 Claims, 4 Drawing Sheets

PHOTOCOUPLER

FIELD OF THE INVENTION

The present invention relates to the improvement of a communication device in a galley for preparing food and drink in an aircraft to be served to the passengers on board.

DESCRIPTION OF THE RELATED ART

Along with the recent increase in size and flight time of the aircraft, demand is increasing for better services to the passengers with respect to the food and drink being served on board.

For example, Patent Document 1, Japanese Patent Application Laid-Open No. 10-155562, discloses a method for serving course dishes in an aircraft.

Further, Patent Document 2, Japanese Patent Application Laid-Open No. 7-135338, discloses a photocoupler used as means for transmitting signals.

The galley is equipped with a hot water system and plugs for feeding power to the heater of service carts and the like, and a large amount of power is consumed when preparing meals.

Various electric devices such as electromagnetic cooking devices are equipped in the galley, and most of the devices are disposed detachably to the galley with a connector for connecting the device to the galley.

The connector comprises wires for connecting the communication circuits and the power circuits according to standards, enabling power to be fed from the galley body to the device and enabling communication between the galley body and electric device.

A storage unit for storing the devices detachably in the galley body comprises rails for guiding the device and a pair of guide holders for securely engaging the device to the galley body.

The connector for connecting the device and the galley body is disposed between the pair of guide holders.

The guide holder disposed on the galley and the guide pin disposed on the electric device to be inserted to the guide holder enables the pin of the connector to be inserted from the correct position and the load on the contact of the connector to be reduced.

However, according to the communication interface using such connector, the control circuit of the galley body and the control circuit of the electric device disposed thereto are connected directly via a wire, so the problem of unwanted emission of electromagnetic waves radiated via the communication wire occurs. In order to cope with this problem, the conventional connector adopts a dedicated filter to be inserted to the communication wire to modify the influence of unwanted electromagnetic radiation.

SUMMARY OF THE INVENTION

The object of the present invention is to provide a communication device for the galley using a guide pin that solves this problem of the prior art.

In order to achieve the above object, a galley for an aircraft according to the present invention comprises, as basic means, a galley body composed of a panel member, a storage unit formed to the galley body for storing a device, and an electric device disposed detachably in the storage unit; wherein the storage unit is equipped with a rail for guiding the electric device, a pair of guide holders, and a connector disposed between the guide holders; the electric device is equipped with a pair of guide pins that engage with the pair of guide holders, and a connector; and the guide pins and the guide holders have a photocoupler composed of a light receiving member and a light emitting member disposed thereto.

According to another possible arrangement, the pair of guide pins can be disposed on the galley, and the pair of guide holders can be disposed on the electric device.

According further to the present galley, a first guide pin of the pair of guide pins comprises a light emitting member of the photocoupler and a second guide pin comprises a light receiving member of the photocoupler, and a first guide holder that engages the first guide pin comprises a light receiving member of the photocoupler and a second guide holder that engages the second guide pin comprises a light emitting member of the photocoupler.

According to the galley of the present invention, a two-way communication circuit is established between the galley body and the electric device detachably disposed in the galley body using a photocoupler composed of members disposed in the guide pin. Optimum power management or the like can be performed by mutually exchanging information constantly via the two-way communication circuit between the galley body and the electric device.

DETAILED DESCRIPTION OF THE PREFERRED EMBODIMENT

Figure 1:
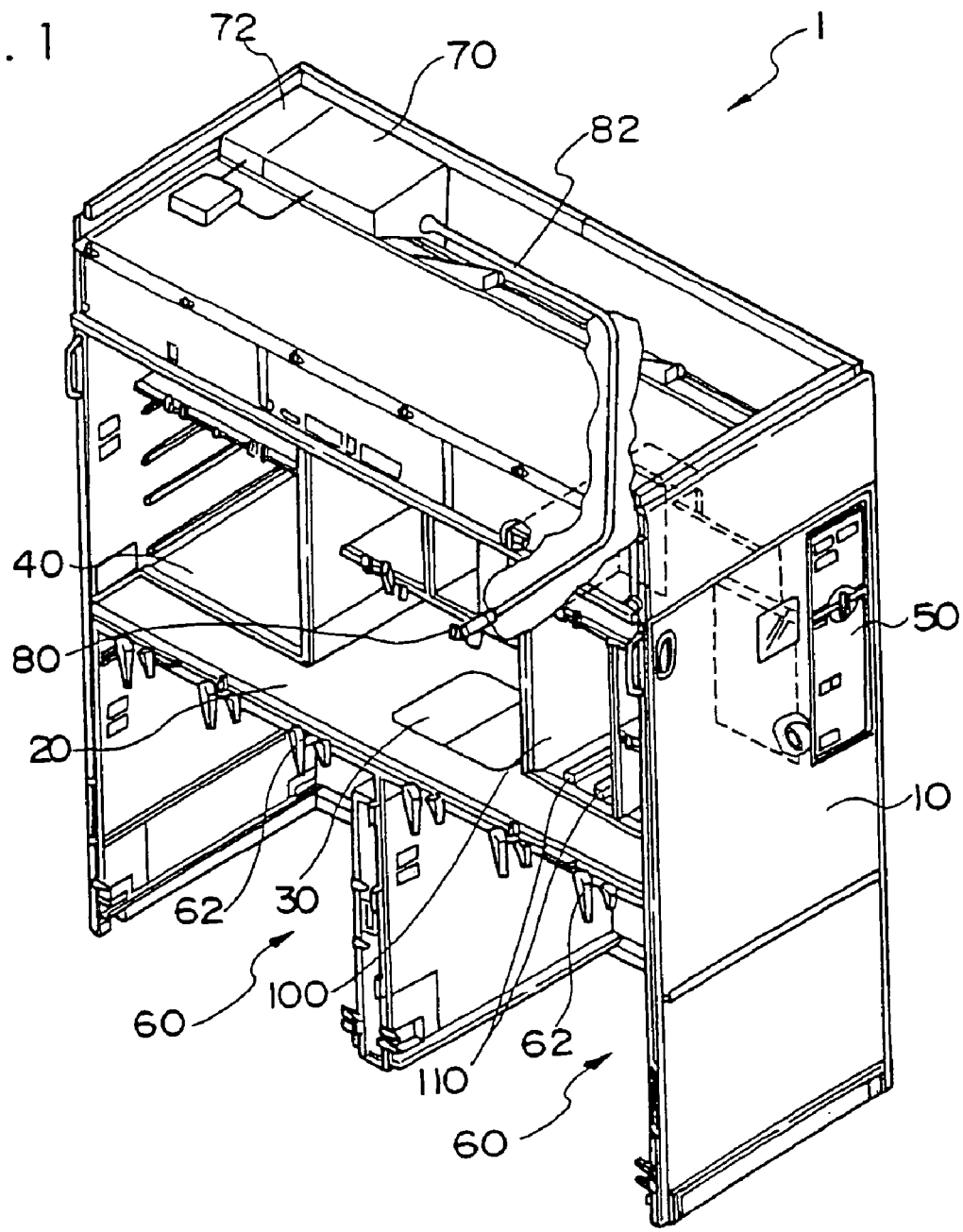
FIG. 1 is a perspective view showing the galley for an aircraft according to the present invention.

FIG. 1 is an explanatory view showing the galley of an aircraft carrying out the present invention.

The galley denoted as a whole by reference number 1 comprises a body 10 formed of a panel that is light weight and has high rigidity, such as a honeycomb panel.

The body 10 includes a kitchen table 20 and a sink 30. The body 10 also has multiple storage units 40, 50 for storing drinks, food, tableware etc. used to serve customers.

A housing 60 for housing a service cart is provided to the lower area of the body 10. The service cart storing multiple trays on which tableware are mounted is prepared in advance at the airport of departure, and placed in this housing 60 until meal service is started. The service cart stored in the housing 60 is connected via a connector not shown to the electric circuit disposed within the body 10.

The heater disposed inside the service cart is turned on at a predetermined time and heats the hot meals.

A large amount of power is consumed when power supply to the service carts are started at once, so a power control circuit is adopted to appropriately control the use of power by controlling the timing to start the power supply to correspond to when the service carts are to be used.

Multiple stoppers 62 are disposed in front of the body 10 so as to lock the stored service carts in position.

A hot water system is equipped to the upper portion of body 10.

The hot water system comprises a hot water tank 70 disposed on the ceiling of the galley body 10, an instantaneous water heater 72, a hot water tap 80 disposed above the sink 30, and a hot water supply line 82 connecting the hot water tank 70 and the hot water tap 80.

Further, a storage unit 100 for detachably storing an electric device is formed to the galley body 10. A pair of guide rails 110 is disposed on the bottom area of the storage unit 100.

Figure 2:
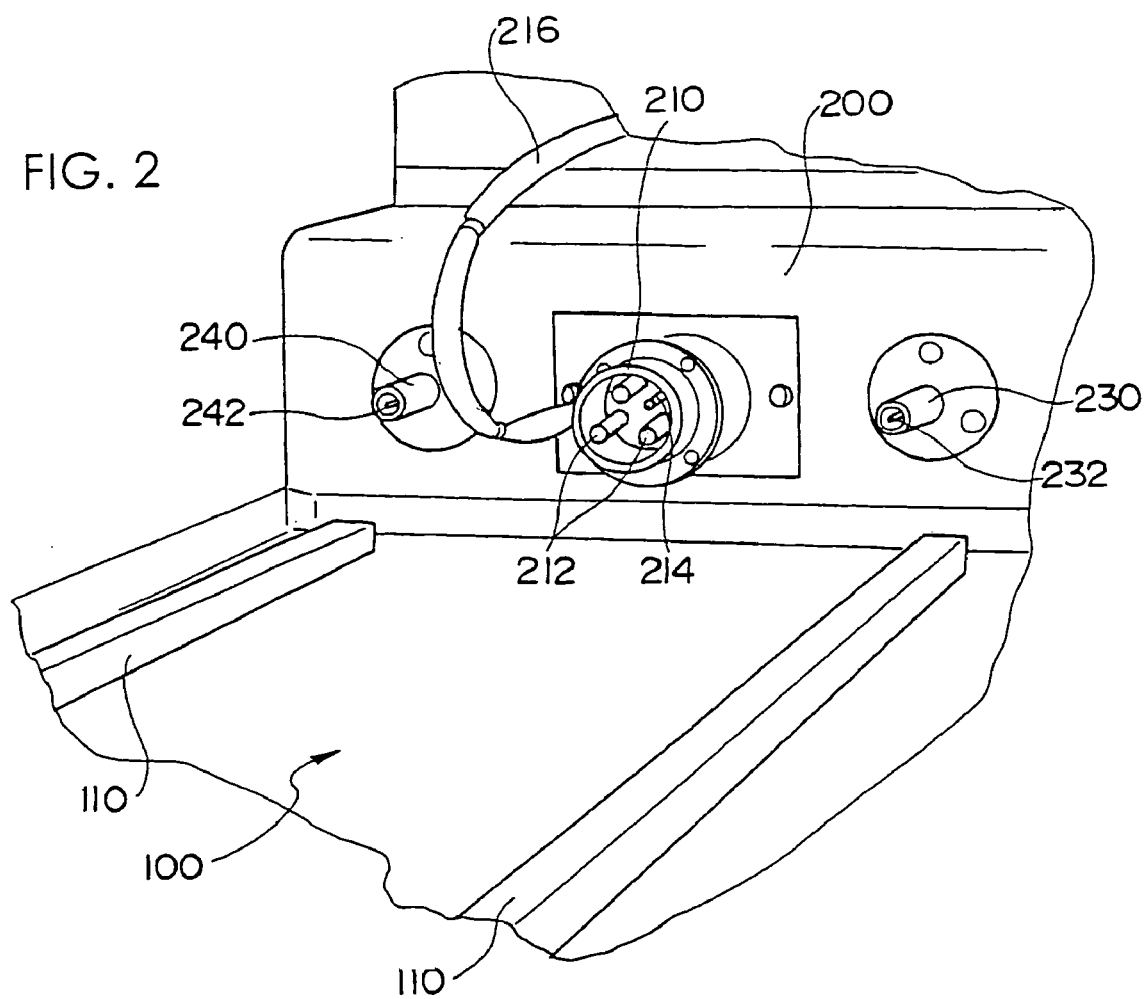
FIG. 2 is an explanatory view showing the storage unit for storing a detachable device.

FIG. 2 is an explanatory view showing the interior structure of the storage unit 100.

A pair of guide rails 110 is disposed on the bottom portion of the storage unit 100, and guides the device to be mounted detachably thereto.

At the back of the storage unit 100 is disposed a connect panel 200 for connecting the device formed integrally to the galley body.

A connector 210 is disposed on the connect panel 200. The connector 210 is disposed at the center of the pair of rails 110, and connects to a connector disposed on the device. The connector 210 includes pins 212 for power and a pin 214 for communication. A cord 216 is connected to the connector 210, and the other end of the cord is connected to a control unit (not shown).

In the connect panel 200, a pair of guide holders 230, 240 is implanted on both sides of the connector 210.

The guide holders 230 and 240 are formed for example of metal pipes, each having therein an element constituting one terminal of the photocoupler.

The guide holders 230, 240 are located either directly above the guide rails 110 or close thereto.

Figure 3:
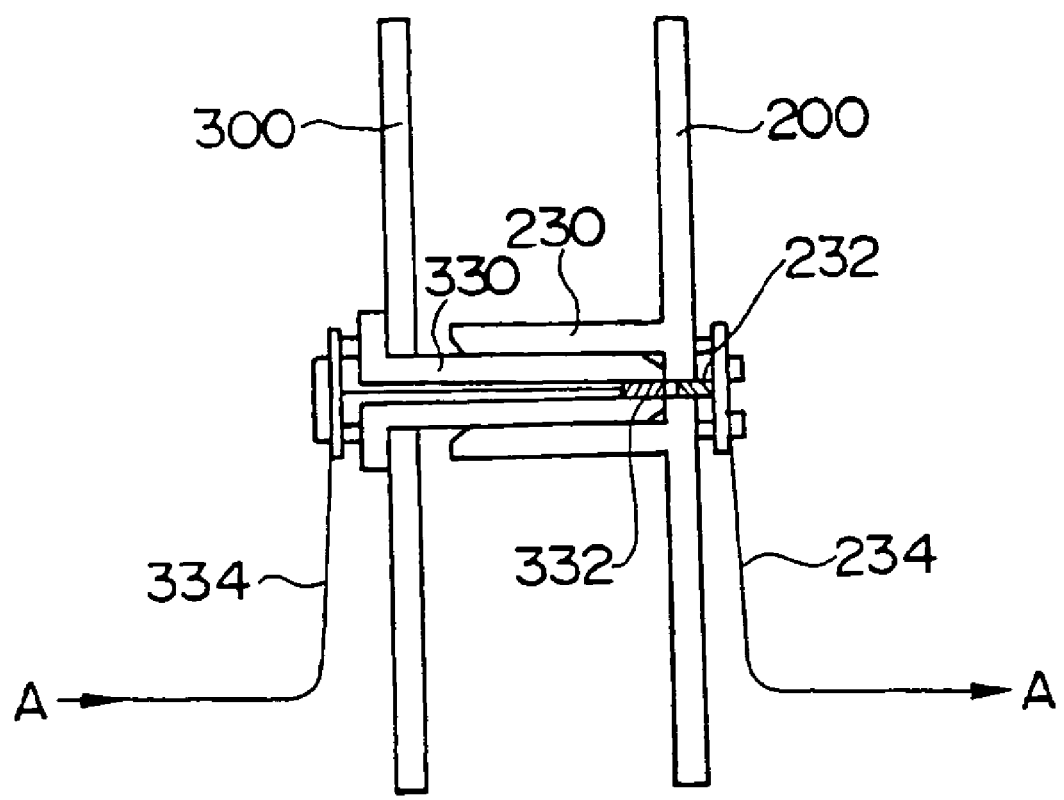
FIG. 3 is an explanatory view showing the structure of a photocoupler.

FIG. 3 shows a state in which an electric device 300 is detachably connected to the connect panel 200.

A first guide pin 330 disposed on the device 300 is inserted to the first guide holder 230 disposed on the connect panel 200.

A light emitting member (LED) 332 constituting a part of the photocoupler is disposed on the tip of the first guide pin 330. The light emitting member 332 is connected via a line 334 to a control unit (not shown) of the electric device 300.

A light receiving member (photo transistor) 232 constituting a part of the photocoupler is disposed on the first guide holder 230, which is connected via a line 234 to a control unit (not shown) equipped to the galley 200.

The signal A generated from the control unit of the electric device 300 is transmitted through the photocoupler composed of the LED 332 of the guide pin 330 and the phototransistor 232 of the guide holder 230, and then via the line 234 to the control unit of the galley.

Figure 4:
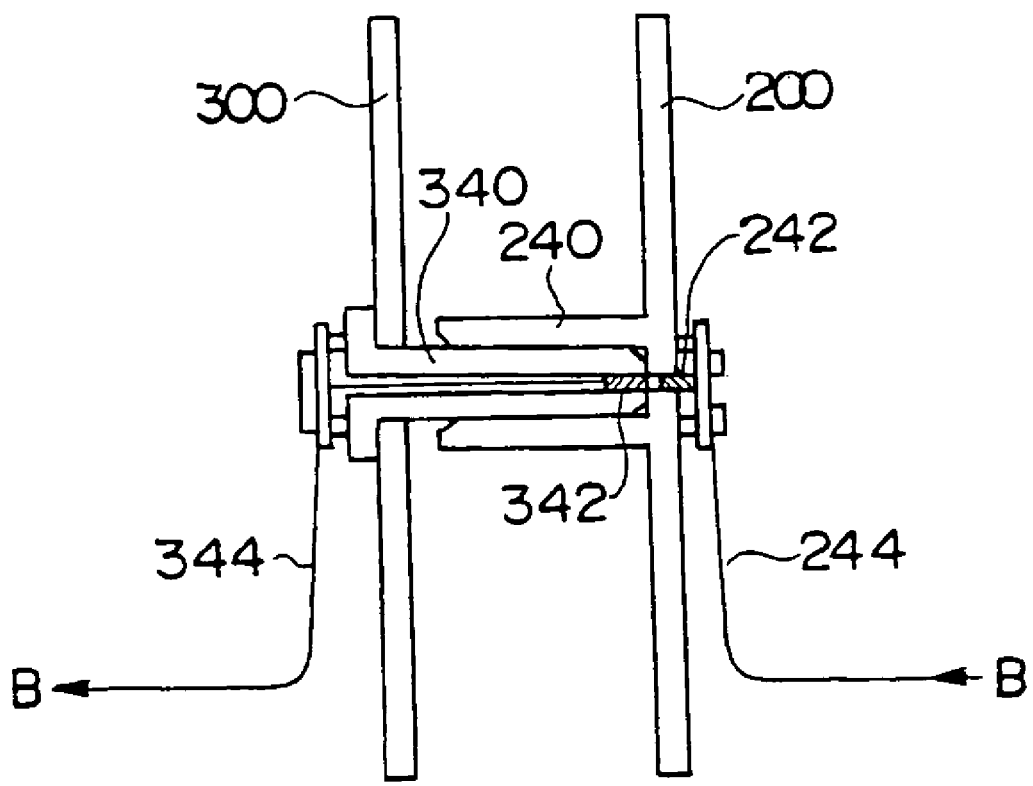
FIG. 4 is an explanatory view showing the structure of a photocoupler.

FIG. 4 shows a second guide pin 340 and the second guide holder 240 in connected state.

A light emitting member (LED) 242 is disposed at the end of the second guide holder 240 mounted to the connect panel 200, which is connected via a line 244 to the control unit of the galley.

A light receiving member (phototransistor) 342 is disposed to the second guide pin 340 mounted to the device 300, which is connected via a line 344 to the control unit of the device.

The signal B generated from the control unit of the galley is transmitted through the photocoupler composed of the LED 242 and the phototransistor 342, and then via the line 344 to the control unit of the device.

The location and shape of the guide pins and guide holders or the type of connectors being used can be changed appropriately according to need.

As explained, according to the present invention, the pair of guide pins for connecting the detachable electric device to the galley has a photocoupler disposed to each guide pin, establishing a two-way communication between the galley and the device and facilitating the development of a power management system or the like in the aircraft.

What is claimed is:

1. A galley including a water tap and a sink for preparing food and drink in an aircraft, said galley comprising:
   a galley body composed of a panel member, a storage unit formed to the galley body for storing a device, and an electric device disposed detachably in the storage unit; wherein
   the storage unit is equipped with a rail for guiding the electric device, a pair of guide holders, and a first connector disposed between the guide holders;
   the electric device is equipped with a pair of guide pins that engage with the pair of guide holders, and a second connector; and
   the guide pins and the guide holders have a photocoupler disposed thereto.

2. A galley including a water tap and a sink for preparing food and drink in an aircraft, said galley comprising:
   a galley body composed of a panel member, a storage unit formed to the galley body for storing a device, and an electric device disposed detachably in the storage unit; wherein
   the storage unit is equipped with a rail for guiding the electric device, a pair of guide pins, and a first connector disposed between the guide pins;
   the electric device is equipped with a pair of guide holders that engage with the pair of guide pins, and a second connector; and
   the guide pins and the guide holders have a photocoupler disposed thereto.

3. The galley of an aircraft according to claim 1 or claim 2, wherein a first guide pin of the pair of guide pins comprises a light emitting member of the photocoupler and a second guide pin comprises a light receiving member of the photocoupler, and a first guide bolder that engages the first guide pin comprises a light receiving member of the photocoupler and a second guide holder that engages the second guide pin comprises a light emitting member of the photocoupler.

* * * * *